Figure 1:
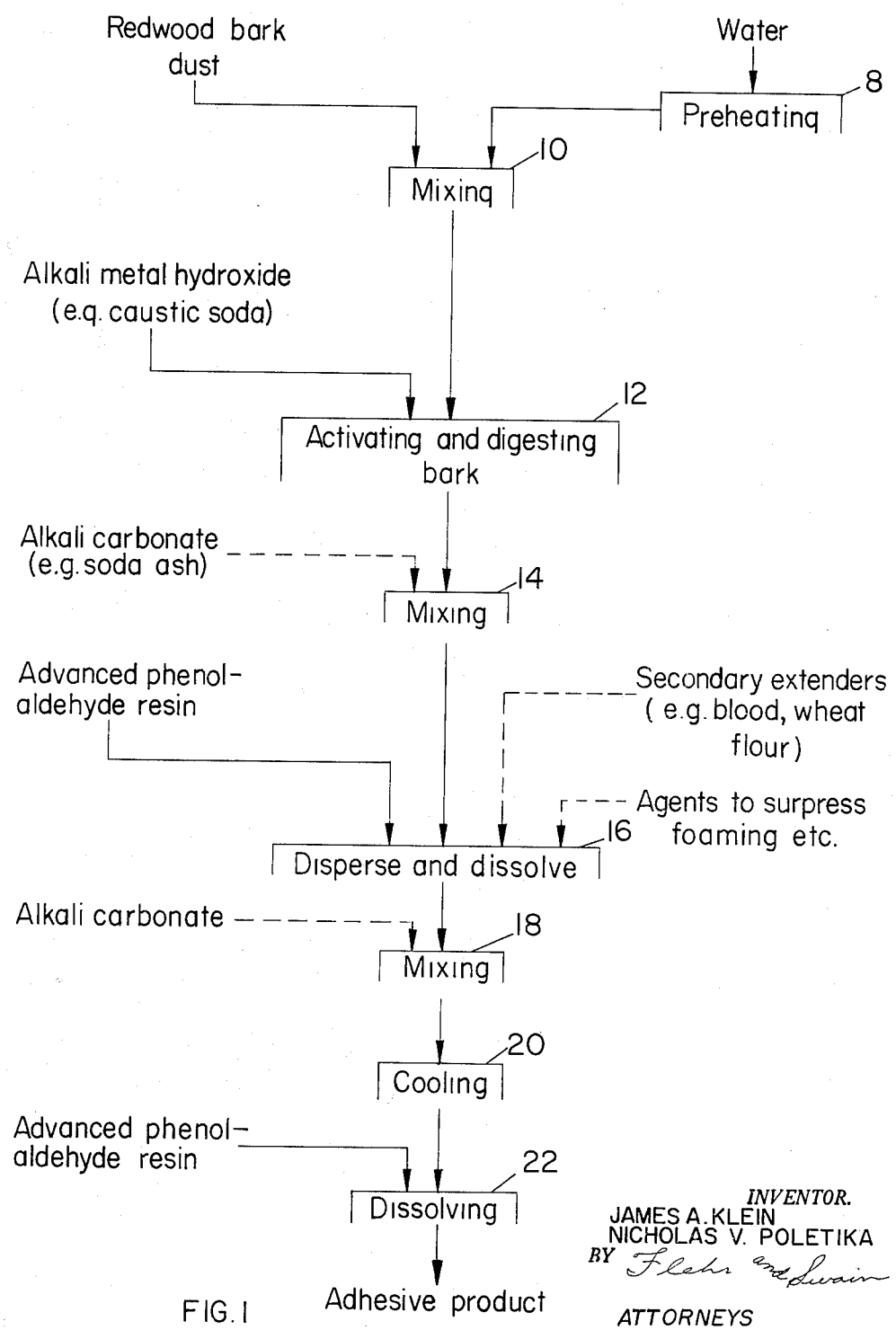

Oct. 19, 1965       J. A. KLEIN ETAL       3,213,045
PHENOLIC ADHESIVES AND METHOD
Filed Sept. 30, 1960                    2 Sheets-Sheet 1

INVENTOR.
JAMES A. KLEIN
NICHOLAS V. POLETIKA
BY Flehr and Swain
ATTORNEYS

3,213,045
PHENOLIC ADHESIVES AND METHOD

James A. Klein, Seattle, Wash., and Nicholas V. Poletika, Fort Bragg, Calif.; said Klein assignor to Reichhold Chemicals, Inc., Seattle, Wash., a corporation of Delaware, and said Poletika assignor to Union Lumber Company, San Francisco, Calif., a corporation of California
Filed Sept. 30, 1960, Ser. No. 59,661
15 Claims. (Cl. 161—262)

This invention relates generally to the art of making phenolic resin adhesives, and to adhesive products obtained thereby. More particularly, it relates to improved phenolic resin adhesives, formulated with redwood bark dust resin extenders, for use in making durable hot-pressed plywood.

Phenolic resin adhesives are extensively used in the manufacture of hot-pressed plywood, having the capacity to resist almost unlimited exposure to moisture, heat and weather. As the phenolic resins do not in themselves possess sufficient body (i.e., viscosity) to permit hot pressing without excessive penetration into the wood, it is customary to use alkali swollen extenders derived from bark dust, corn cobs, and similar powdery waste materials, as extenders to selectively absorb and hold the resin in the glue line. In a typical procedure (described in U.S. Patent No. 2,574,784), bark powder from such trees as the Douglas fir, Ponderosa pine, and Western hemlock, is reacted with water and alkali at an elevated temperature and the resulting reaction mass reacted with the phenolic resin to form the adhesive. Heat in excess of about 180° F. is essential in the alkali pulping reaction to insure compatibility of the extender so that the resin will not precipitate, gel, or otherwise separate from the adhesive system. In general, this degree of heat is undesirable since it produces moisture losses due to "steaming," and presents a danger in the handling of the hot liquid. The high temperatures also lengthen the mixing time so more time is required both for heating and cooling.

Phenolic resins used heretofore also possess the shortcoming, compared to the protein and urea resin adhesives, of being less reactive in the hot press. A high rate of reactivity is necessary, however, to insure setting of the adhesive without undue prolonging of the press times or drastic heat treatment. It is well known that even a minor increase in the press time (e.g., 2 to 3 minutes), or processing temperature, will cause the panels to come out of the press much too dry for use, and require costly and tedious remoistening processes to bring them back up to the desired commercial range of from 6 to 10% moisture content. Such processing is objectionable since it tends to warp and embrittle the wood, and to produce panels of inferior quality. A high rate of reactivity is also desirable to give the shortest press time and maximum production from a given plant.

Because of the generally more satisfactory bond provided by the phenolic adhesives, the art has sought to provide improved phenolic resins which would be more reactive in the hot press. Typical of such resins are the phenol aldehyde resins disclosed, for example, in U.S. Patents 2,360,376 and 2,437,981. In general, these resins are obtained by reactions involving a multiplication or increasing of the chemical linkages of the materials undergoing reaction, to achieve a final product having a greater degree of advancement of polymerization. It has been determined that adhesives employing these resins require relatively lower temperatures and shorter press times than the adhesives employing the prior phenolic resins. We have found, however, that the advantage obtained by use of the improved resins is greatly offset by an apparent incompatibility of the longer chain resin fractions with the bark extenders normally employed, producing an inherent instability of the resulting adhesive systems. Long periods of storage or low heat, for example, will cause the resin to come out of solution, precipitate, or irreversibly gel with inclusion of solvent. Use of the improved resins has therefore involved the serious disadvantage when used with bark extenders that desired hot press characteristics could not be obtained consistent with essential viscosity or body for proper spreading and bonding.

Resins have also been prematurely bodied to provide compatibility with bark extenders by use of thickening agents such as methyl cellulose, or hydrophillic colloidal agents such as hydroxy alkyl cellulose. These resins, while possessing desired viscosity for spreading, actually are less advanced lower molecular weight resins, which consequently require longer press times for setting to the insoluble state. They are also often characterized by an objectionable odor of free phenol and/or formaldehyde.

The present invention is directed to a solution of the above difficulties and has as a general object the provisions of an improved phenolic resin adhesive, employing a bark dust extender, which not only has excellent hot-press characteristics but also a high degree of internal stability as evidenced by a consistently high and stable viscosity and desired body.

Another object of the invention is to provide stable, improved phenolic resin adhesives, employing alkali-pulped bark extenders, capable of being hot-pressed at lower temperatures and for shorter pressing cycles than has heretofore been possible.

A further object of the invention is to provide a phenolic resin adhesive having the above characteristics, employing a bark extender derived from the bark of the California redwood.

Another object of the invention is to provide an improved method for making the adhesive compositions of the present invention.

Another object of the invention is to provide such a method for making phenolic resin adhesives wherein all reactions can be carried out at substantially reduced temperatures, and not in excess of about 160° F.

Figure 2:
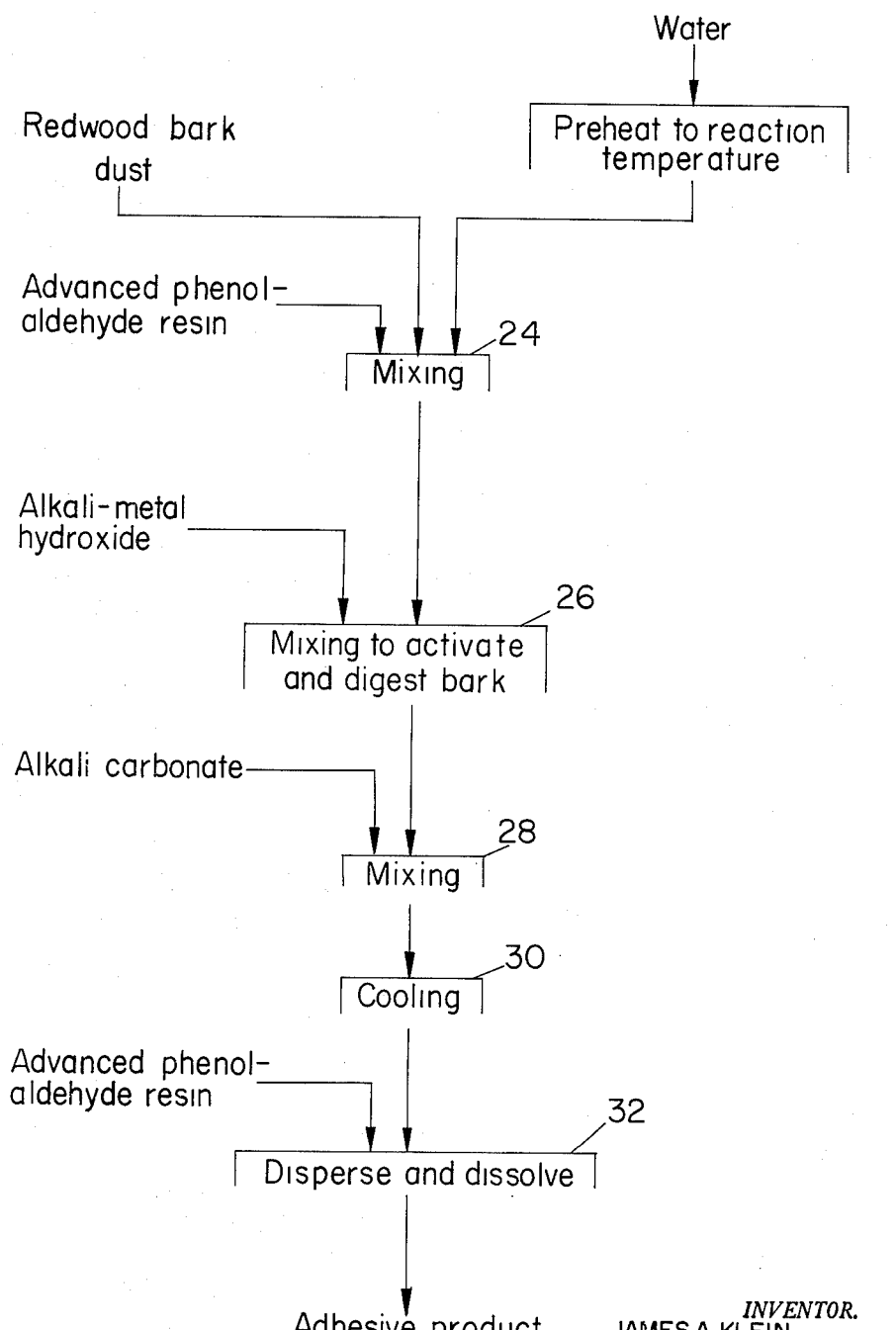

Other objects and advantages of the invention will appear from the following description and from the drawings in which:

FIGURE 1 is a flow sheet outlining one procedure for carrying out the invention; and FIGURE 2 is a flow sheet illustrating a modified procedure in accordance with the invention.

Despite continuing progress within the industry, the methods employed in lumbering the California redwood still involve appreciable waste in the form of stumps, tops, branches, bark, and so forth. Bark accounts for a substantial portion of this waste because of the unusual thickness of the redwood bark (averaging 3 to 10 inches in old growth). It is estimated, for example, that bark waste amounts to from 400 to 600 cords per million feet board measure (Spaulding). Approximately 50% of the bark separated commercially is recovered in the form of fiber. The remainder, comprising a reddish amorphous powder known to the redwood lumberman as redwood "bark dust" or "bark sand," has heretofore represented a waste product of little commercial value.

In accordance with the present invention, redwood bark dust is employed in the manufacture of highly successful adhesive compositions for use in plywood manufacture. In general, we react the redwood bark dust with alkali metal hydroxide at a relatively low temperature, ranging from about 100 to 160° F., and thereafter disperse in the product of this reaction a predominantly high molecular weight aqueous, alkaline, phenol-aldehyde resin of the type described above as having desired hot-press characteristics. The reaction described in advantageously carried out in the presence of a suitable wetting agent, such as an alkali carbonate (FIGURES 1 and 2). In some cases, it is also desirable to mix a portion of the resin with the bark prior to the reaction with the alkali metal hydroxide (FIGURE 2), although this is not essential.

In general, the resins employed herein are characterized by a high degree of advancement of polymerization (as evidenced by formation of a precipitate on addition of ethanol to aqueous alkaline solutions of the resins) and may be shown to be primarily high molecular weight materials (e.g. by the techniques of paper chromatography). We have found the redwood bark dust to be highly compatible with these resins, and have additionally found that phenolic resin adhesives obtained by our invention possess an unexpected, uniformly high viscosity suitable for application or spreading on sheets of veneers with a proper balance of penetration for hot-pressing. Such adhesives also possess a high degree of thermo-setting reactivity, and consequently can be hot-pressed with considerably greater speed and at substantially lower temperatures than was possible with prior art adhesives. By way of illustration, plywood hot-pressed for 6½ to 7½ minutes, at temperatures below about 320° F., is consistently characterized by excellent bonding strength of the adhesive and exceptional resistance to exposure to moisture, heat and weather.

One example of our process is outlined in the flow sheet of FIGURE 1. The mixing of the redwood bark with water, which preferably has been preheated to substantially reaction temperature, is shown in step 10. In step 12 the resulting mixture is reacted with alkali-metal-hydroxide (e.g., caustic soda) to actuate and digest the bark. It is essential that this reaction be carried out at relatively low temperatures in the range from about 100° F. to a temperature not in excess of about 160° F. In general, no more than about 10 to 30 minutes is required to activate the phenolic components of the bark, with 15 to 20 minutes being optimum. In step 14 a quantity of alkali carbonate (e.g., soda ash) can be optionally added as a wetting agent, to impart desired characteristics to the final adhesives. Step 16 represents the addition of the predominantly high molecular weight, heat reactive phenol-aldehyde resin to the bark-alkali reaction product. (In commercial practice, the resin is preferably in the form of an aqueous alkaline solution.) In general, this step accomplishes a solubilizing of the resin by combination of the alkali with the resin to form a water-soluble product. If desired, the product may be modified at this point (or alternatively in step 10) by the addition of secondary extenders such as soluble blood, wheat flour, or similar materials. Proteinaceous or amylaceous materials of this type are customarily employed to assist in viscosity control, and to impart body to the adhesive to further limit penetration into the wood. Additional agents (e.g., to supress foaming etc.) may also be added in the step 16. Step 18 represents an alternate or further point of addition of the alkali carbonate. After the reaction has proceeded for about 10 to 30 minutes the reaction mass may be cooled in step 20 to a temperature, preferably below about 90° F., to insure the obtaining and holding of optimum consistency (viscosity) for application or spreading of the adhesive. Desired viscosities range from about 2,000 to 50,000 centipoises (at 77° F.), and will depend on the proportion of resin additionally introduced in the step 22. Preferred viscosities will range from 2,500 to in excess of 20,000 cps.

As illustrated in FIGURE 2, the method of the invention may be modified by the addition of at least a portion of the resin in step 24 prior to the addition of the alkali in step 26. In steps 28, 30 and 32 the processing can be substantially as previously described in connection with steps 18 to 22. Again the final viscosities of the adhesive obtained is a function primarily of the processing temperatures, which can be controlled with or without cooling in step 30, as may be necessary in a particular processing situation.

In general, the bark dust employed in the present invention is derived from bark of the California redwood, and may be removed from the cut timber in usual fashion (e.g., by means of hydraulic debarkers, etc.) with subsequent processing to reduce the bark to fiber, dust and fines. This operation is normally accomplished by impacting of the bark in swing hammer-type hogs, by air drying and by separation in rotary type screens. The dust and fines can be passed over a vibrating mesh screen to remove the dust which is then reduced to minus 100 mesh (Tyler screen series) in a suitable disintegrating apparatus. The resulting dust product is made up of broken fibers, small cells, and the powdered walls of dead parenchyma cells and sieve cells, and is a heterogeneous mixture of particle sizes. In general, bark ground to pass through a 100-mesh Tyler screen will give a desired product having the following mesh analysis.

| Screen size: | Weight percent retained |
| --- | --- |
| 60 | 0.4 |
| 100 | 19.6 |
| 200 | 42.0 |
| Through 200 | 38.0 |

The use of redwood bark dust in the present invention is to be distinguished from the use of other comminuted bark materials such as the bark powders derived from fir, pine, cedar or hemlock trees. In general, redwood bark dust is a complex organic compound, or mixture of such compounds, containing free carboxyl groups, aliphatic and phenolic or enolic hydroxyl groups. Such compound or mixture has been called a "substituted phenolic acid," the major component comprising a brown amorphous phenolic acid material sometimes also referred to as "bark lignin." The principal distinction between redwood bark dust and the bark dusts derived from other soft woods is the larger percentage of phenolic hydroxyl, which in the present invention is believed to render the redwood dust more compatible with the high molecular weight phenolic resins employed.

As a further distinction, redwood bark extractives have been found to contain very little tannin, whereas Douglas fir bark, for example, is very rich in tannin. Douglas fir bark is also high in wax and dihydroquercetin, while the redwood bark contains only traces of these components, if any. In like fashion, the alcohol solubles of redwood bark consist largely of phlobaphenes and humic acids, while the alcohol soluble fraction of Douglas fir is largely tannin and very small amounts of phlobaphenes. Finally the redwood bark has been found to contain a considerably smaller proportion of extractives than the other soft woods. These chemical indications clearly show the different nature and composition of the redwood bark dust from those commonly employed in the prior art.

In carrying out the alkali activation and digestion of the redwood dust described herein, we generally employ sodium hydroxide in dry (flake) form, dissolved in water to form a desired concentration. However, alkali metal hydroxides other than sodium hydroxide (e.g., potassium and lithium hydroxide), can also be satisfactorily employed.

In the manufacturing procedures to produce the improved adhesive compositions for plywood manufacture, we can employ any of the predominantly high molecular weight aqueous, alkaline phenolaldehyde resins disclosed in U.S. Patents 2,437,981 or 2,360,376 or resins of similar characteristics. As previously mentioned, these resins are characterized by a high degree of advancement of polymerization, as evidenced by increased molecular weight and proportion of relatively long linear chains and cross chains, and have viscosities within a preferred range of about 200 to 5000 centipoises at a non-volatile content of about 40%, (at 77° F.). Preferred resins include the phenol-formaldehyde resins and particularly those in which molar rates of aldehyde to phenol are within the range from about 1.5:1 to about 3.0:1. However, other phenol-aldehydes of similar character such as phenol-acetaldehyde, phenol-furfural, and phenol-benz aldehyde may be successfully employed.

In general, and assuming that the adhesive compositions are compounded from redwood bark dust, alkali-metal hydroxide (e.g., NaOH), alkali-carbonate (e.g., soda ash), aqueous alkaline predominantly high molecular weight phenol-aldehyde resin (e.g., alkaline solution of phenol-formaldehyde), various modifying agents (e.g., proteinaceous matter, defoamers, etc.), and water, the proportions may range as follows:

7.5 to 10% redwood bark dust
1.5 to 2.5% alkali metal hydroxide
1.5 to 2.5% alkali carbonate
50 to 70% phenol aldehyde resin
0 to 3% proteinaceous and/or amylaceous matter
0 to 0.4% defoamer
20 to 30% water The foregoing general range of ingredients is suggested to make clear that the invention is not limited to a specific proportioning of the ingredients, or to certain of the ingredients disclosed herein by way of example.

The following specific examples are representative of the practice of the invention.

Example 1

To an agitated, water jacketed reaction vessel were added 450 parts of water, preheated to 160° F., and 200 parts of redwood bark dust, having a mesh analysis of approximately 80% minus 100 mesh Tyler screen. This mix was agitated for 2 minutes, at which time 80 parts of a 50% solution of NaOH were introduced and the resulting mixture reacted at a temperature between 140 to 150° F. for a period of 15 minutes. To the product of this reaction were added 425 parts of a predominantly high molecular weight, aqueous, alkaline phenol-formaldehyde resin characterized by a demonstratably high degree of advancement of polymerization (e.g., by techniques of paper chromatography, and by the formation of a precipitate on addition of ethanol). Specific properties of the resin were as follows: solids—41%, specific gravity—1.186, viscosity—600 cps. at 77° F., pH—12.5. Five parts of a defoamer and 50 parts of spray dried soluble beef blood were also introduced and the entire mix agitated 10 minutes at a temperature between 130 and 135° F. Following the above processing, 40 parts of technical grade soda ash (58% $Na_2O$) were added, the mix agitated an additional 5 minutes, and cooling water introduced to the jacket to cool the reaction mass to below 90° F. At this point 825 parts of the resin were introduced, with additional agitation for 5 minutes. The resulting product had a spreading viscosity of 24,000 cps. at about 85° F. and a consistency and body such that the adhesive material spread easily on the plywood with minimum penetration.

The above adhesive was employed in the manufacture of six panels of 13/16-inch 5-ply Douglas fir plywood, using 62 to 64 pounds of the adhesive per 1000 square feet of double glue line and hot-pressing at 175 p.s.i. for 7½ minutes at 285° F. Closed assembly periods varied from 5 to 25 minutes. 1 x 3-inch shear samples of each panel were then subjected to standard boil and wet-shear tests, and the results recorded. In the boil-shear test the samples are subjected to a destructive cycle consisting of immersion in boiling water for 4 hours, baking at 140° F. for 20 hours, and immersion in boiling water for an additional 4 hours. The specimens are thereafter removed and stressed to destruction in a Globe shear testing machine at a constant rate of loading while still wet. The percent of wood failure along or near the glue line and the shearing stress at rupture in pounds per square inch, provide a signficant evaluation of the effectiveness of the adhesive. In the wet-shear test the samples are soaked in water at room temperature for 48 hours prior to testing, and are likewise tested in the wet condition. Boil-shear results for the six panels averaged 95% wood failure, at an average shearing stress at rupture of 89 p.s.i.; wet-shear results averaged 94% wood failure, at an average shearing stress at rupture of 104 p.s.i.

These results clearly indicate the high hot-press reactivity coupled with desirable spreading characteristics and bonding strength and resistance, of the resinous adhesive thus produced. In general, more than 85% wood failure indicated an adhesive of good exterior quality, whereas less than 80% wood failure is considered unsatisfactory. Shear at failure is of importance only if the value is very low.

Example 2

Using the amounts and substantially the procedure of Example 1, water, redwood bark dust and caustic were mixed and reacted for 15 minutes at a temperature of 140 to 150° F. Thereafter 40 parts of technical grade soda ash were added to the reaction mass, and the mix agitated 5 minutes. To this were added 250 parts of the phenol-formaldehyde resin and 50 parts of wheat flour, the mix again being agitated 5 minutes and cooled to below 90° F., following which 1000 parts of phenol-formaldehyde resin were added with an additional 5 minutes agitation. The spreading viscosity of this adhesive was 10,000 c.p.s. (at 84° F.).

Six panels of 13/16-inch 5-ply Douglas fir plywood were made with the adhesive using a glue spread of 62 to 64 pounds per 1000 square feet of double glue line on 3/16-inch core veneers, and pressing in a hot-press at 175 p.s.i. for 7½ minutes at 285° F. Closed assembly periods varied from 5 to 25 minutes. Boil-shear results averaged 94% wood failure at an average shear stress of 115 p.s.i.; wet-shear results averaged 91% wood failure at an average shear stress of 129 p.s.i.

Example 3

Following the identical procedure, and employing the same reaction temperatures and periods of mixing described in Example 1, a phenolic resin adhesive was prepared according to the following formulation:

| Ingredient: | Parts by weight |
|---|---|
| Redwood bark dust (80% minus 100 mesh screen) | 200 |
| Water at 160° F. | 500 |
| NaOH (50% solution) | 80 |
| Phenol-formaldehyde resin | 400 |
| Defoamer | 5 |
| Soluble blood | 50 |
| Soda ash | 40 |
| Phenol-formaldehyde resin | 780 |

The specific phenol-formaldehyde resin employed in the above formula is likewise of the predominantly high molecular weight, aqueous, alkaline type described in Example 1, and is similarly characterized by a demonstratably high degree of advancement of polymerization. Its specific properties are as follows: solids—43.8%, specific gravity—1.195, viscosity—600 cps. at 77° F., pH—12.2. The spreading viscosity of the adhesive produced was 8200 cps. at 93° F.

Six 5-ply 13/16-inch Douglas fir plywood panels were prepared using 62 to 64 pounds adhesive per 1000 square feet of double glue line. The panels were again pressed for 7½ minutes at 175 p.s.i. and 285° F. Boil-shear tests of specimen samples of these panels produced an average of 93% wood failure at an average shear stress at rupture of 104 p.s.i.

Example 4

Employing the same formulating procedure as in Example 2, an adhesive was produced according to the following formula:

| Ingredient: | Parts by weight |
|---|---|
| Redwood bark dust | 200 |
| Water at 160° F. | 550 |
| Sodium hydroxide (50% solution) | 80 |
| Soda ash | 40 |
| Phenol-formaldehyde resin | 250 |
| Wheat flour | 52 |
| Phenol-formaldehyde resin | 1000 |

The spreading viscosity of the resulting adhesive was 4500 cps. at 81° F.

Standard Boil and Wet-shear tests of six panels, made as in Example 2, gave the following average results: Boil-shear test—86%, wood failure, 110 p.s.i. shear stress; Wet-Shear test—85% wood failure, 132 p.s.i.

Example 5

Employing a conventional agitated jacketed reaction vessel, 160 parts of redwood bark dust (80% minus 100 mesh screen) were mixed with 280 parts of water preheated to 150° F. To this were added 80 parts of a predominantly high molecular weight, aqueous alkaline phenol-formaldehyde resin having properties and characteristics as described in Example 2. The mix was agitated for 2 minutes at which time 64 parts of a 50% solution of NaOH was added and the mix again agitated for 2 minutes. Upon adding 32 parts of technical soda ash (58% Na$_2$O) the mix was reacted for 24 minutes at a temperature of approximately 120° F. Water was then introduced to the jacket to cool the reaction vessel until the contents were below 90° F. At this point 920 parts of the resin was added with additional agitation for 5 minutes. The resulting adhesive had a spreading viscosity of about 2500 cps. (at 70° F.) and a consistency and body particularly adapted to plywood manufacture.

Six panels of ⅜-inch 3-ply Douglas fir plywood were made using this adhesive with a glue spread of 58 to 60 pounds per 1000 square feet of double glue line, and pressing in a hot-press at 200 pounds per square inch for 6½ minutes, with two panels per opening, at a platen temperature of 285° F. Closed assembly times varied from 5 to 25 minutes. Shear samples of the resulting plywood were subjected to the standard Boil-shear test with the following average results: wood failure—92%, shear stress—174 p.s.i.

Example 6

The procedure described in Example 5 was repeated with the exception that the resin employed had a somewhat higher solids content (e.g. 43.8%), a specific gravity of 1.195, and a pH of 12.2. The initial viscosity of the resin was 600 cps. (at 77° F.). The viscosity of the finished adhesive was 2700 cps. (at about 70° F.), and produced a desired spreading consistency.

Shear and wood failure tests were performed on panels made with this adhesive, in identical manner as described in Example 5, with the following average results: wood failure—94%, shear stress—187 p.s.i.

The results set forth in these examples clearly show that redwood bark dust cooked at relatively low temperatures will make satisfactory plywood, using the advanced high molecular weight resins—with or without the use of secondary extenders such as soluble blood or wheat flour. They also indicate the high reactivity of the adhesives in the hot-press, as evidenced by short press times and relatively low curing temperatures, and the execellent heat and moisture resistance of the cured, set adhesives.

Example 7

To evaluate the new adhesives formulated with redwood bark dust, in comparison with similar adhesives made with other softwood barks dusts (specifically Douglas fir), a series of phenolic resin adhesives were prepared according to the following formulas (employing the mixing procedure described in example 3):

| Ingredient | 1 | 2 | 3 | 4 |
|---|---|---|---|---|
| Bark dust: | | | | |
| (a) Redwood | 200 | | | |
| (b) Douglas fir | | 233 | 250 | 297 |
| Water at 140° F | 500 | 700 | 750 | 892 |
| NaOH (50% solution) | 80 | 93 | 100 | 119 |
| Soda ash | 40 | 47 | 50 | 59 |
| Phenol-formaldehyde resin—Two-stage addition as in Example 3: | | | | |
| (a) Relatively high mol. wt. resin | 1,180 | 1,743 | 1,662 | |
| (b) Relatively low mol. wt. resin | | | | 1,430 |
| Pine oil | | 7 | 6 | 8 |
| Defoamer | 5 | | | |
| Soluble blood | 50 | 65 | 70 | 83 |
| | 2,055 | 2,888 | 2,888 | 2,888 |

The predominately high molecular weight resins used in the formulas #1 to #3 have the properties and characteristics desired for use in this invention (specifically those described in Examples 1 and 3). The lower molecular weight resin of #4 was the prematurely bodied type (employing hydroxyethyl cellulose as a thickening agent) described in U.S. Patent 2,682,897. This resin had a solids content of 50%, a specific gravity of 1.177, a viscosity of 1000 cps., and a pH of 9.4. During the formulating of the adhesives, all processing temperatures were maintained below 150° F. and generally below about 145° F.

1³⁄₁₆-inch 5-ply Douglas fir plywood panels were prepared with the above adhesives employing 60 to 65 pounds per 1000 square feet of double glue line, and pressed for varying periods at 285° F., using pressures of 175–200 pounds per square inch. Spreading viscosities of the adhesives, pressing times, and the results of standard Boil-hear tests are set forth in Table I below:

Table 1

| Formula | Press time, min. | Spread vis., cps. at 70° F. | Wood failure (percent), boil-shear test | Shear at failure (p.s.i.) |
|---|---|---|---|---|
| 1 | 7½ | 2,700 | 93 | 104 |
| 2 | 7½ | 1,000 | 54 | 130 |
| 3 | 7¼ | 1,200 | 26 | 130 |
| 4 | 9 | 12,000 | 59 | 127 |

These results demonstrate that the Douglas fir bark dust, processed at temperatures below about 160° F., does not produce a satisfactory adhesive for use in plywood manufacture, regardless of the type resin employed. They also demonstrate the longer press times required for the lower molecular weight resins (9 minutes, as compared to 7½ minutes for the resins of the invention).

Example 8

To evaluate the influence of temperature on the alkali pulping reaction with the redwood bark dust, a series of phenolic resin adhesives were prepared, under controlled temperature conditions, according to the following formula:

| Ingredient: | Parts by weight |
|---|---|
| Redwood bark dust | 100 |
| Water | 300 |
| Wheat flour | 10 |
| Soluble blood | 10 |
| Defoamer | 2 |
| Sodium hydroxide (50% solution) | 40 |
| Soda ash | 20 |
| Phenol-formaldehyde resin | 715 |

In formulating each adhesive, the water, redwood bark dust, wheat flour, blood and defoamer were mixed and reacted for 2 minutes, at which time the caustic was added with further mixing for a minute. The soda ash was added to the reaction mass, and the mix agitated 20 minutes. Throughout these pre-mixing operations, reaction temperatures were carefully controlled for each formulation to maintain a desired pre-mix temperaure as indicated in Table II below, employing cooling water or steam in the mixer jacket, as necessary. The phenol-formaldehyde resin was then added with additional agitation and cooling to prevent undesired reaction of the resin and to bring the adhesive temperature to below about 85° F.

Six panels of 3/16-inch 5-ply Douglas fir plywood were made with each adhesive formulation using a spread of 62 to 64 pounds of adhesive per 1000 square feet of double glue line and pressing in a hot-press at 200 p.s.i. and 300° F. for 7 minutes. Closed assembly periods varied from 5 to 25 minutes. Standard boil-shear and wet-shear tests were run on specimen samples obtained from each panel, with the results as indicated in Table II.

uct is cooled to a temperature below about 90° F. prior to addition of said resin.

5. A process as in claim 1 wherein said resin is a phenol-formaldehyde resin.

6. A process as in claim 1 wherein a portion of said phenol-aldehyde resin is mixed with the bark dust prior to reacting with said alkali-metal hydroxide.

7. In a process of making stable, high viscosity phenolic resin adhesives characterized by a high degree of reactivity in the hot-press, the steps of reacting redwood bark dust with alkali-metal hydroxide in the presence of water and at a relatively low temperature, ranging from about 100° F. to 160° F., cooling the product of said reaction to a temperature below about 90° F., and dissolving in the cooled reaction product a predominantly high molecular weight, aqueous alkaline phenol-aldehyde resin, characterized by a high degree of advancement of polymerization, said resin characteristics being evidenced by a viscosity of the resin at 77° F. of from 200 to 5000 centipoises and the formation of a precipitate upon addition of ethanol to the resin.

*Table II*

[Pre-mix temperatures, ° F.]

| Adhesive characteristics | 80 | 100 | 120 | 140 | 160 | 180 | 200 |
|---|---|---|---|---|---|---|---|
| Viscosity: | | | | | | | |
| Initial | 1,820 | 1,870 | 2,420 | 2,550 | 2,600 | 300 | 5,600 |
| 24-hour | 1,900 | 3,350 | 3,790 | 4,740 | 4,400 | 5,700 | Over 10,000 |
| Appearance | (¹) | Smooth | Smooth | Smooth | Smooth | Smooth | Smooth |
| Specific gravity | 1.13 | 1.135 | 1.14 | 1.145 | 1.14 | 1.12 | 1.12 |
| Wood Failure, percent— | | | | | | | |
| Boil-shear test: | | | | | | | |
| Average | 97 | 97 | 96 | 99 | 99 | 94 | 84 |
| High | 100 | 100 | 100 | 100 | 100 | 100 | 98 |
| Low | 94 | 91 | 93 | 94 | 98 | 86 | 27 |
| Wet-shear test: | | | | | | | |
| Average | 95 | 96 | 96 | 94 | 95 | 91 | 74 |
| High | 98 | 99 | 99 | 98 | 99 | 100 | 99 |
| Low | 90 | 86 | 92 | 76 | 76 | 79 | 14 |
| Overall average | 96 | 96 | 96 | 96 | 95 | 92 | 74 |
| Bonding | Good | Good | Good | Good | (²) | (²) | (²) |

¹ Slight separation.
² Occasional spottiness.

The above results show that satisfactory adhesives are obtained within a range of mixing temperatures from about 100 to 160° F. Satisfactory test results were obtained with the 80° F. mix but the indicated slight tendency to separation is undesirable from a commercial standpoint. The adhesives pre-mixed within the range of 160° to 200° F. tended to show occasional spottiness due to poor transfer of the adhesive, becoming worse for the 180° F. pre-mix and quite evident in the low results of the 200° F. mix. (Poor transfer is generally attributable to viscosity conditions in the adhesive, giving rise to dryness and improper penetration during the pressing.)

We claim:

1. In a process of making stable, high viscosity, highly reactive phenolic resin adhesives, the steps of reacting redwood bark dust with alkali-metal hydroxide at a relatively low temperature ranging from about 100° F. to 160° F., without the addition of external heat, and dispersing in the product of said reaction an aqueous alkaline phenol-aldehyde resin characterized by a predominantly high molecular weight and high degree of advancement of polymerization, said resin characteristics being evidenced by a viscosity of the resin at 77° F. of from 200 to 5000 centipoises and the formation of a precipitate upon addition of ethanol to the resin.

2. A process as in claim 1 including the step of pre-grinding said redwood bark dust to a fine powdery state, capable of substantially passing through a 100 mesh Tyler screen.

3. A process as in claim 1 wherein said alkali-metal hydroxide is sodium hydroxide.

4. A process as in claim 1 wherein said reaction prod-

8. A process as in claim 7 including the step of pre-heating the water present during said reaction to approximately the reaction temperature.

9. A process as in claim 7 wherein an alkali carbonate is mixed into said reaction mass prior to the cooling thereof.

10. A process as in claim 7 wherein proteinaceous matter is added to said reaction mass prior to the cooling thereof.

11. A process as in claim 7 wherein said reaction is carried out within a period of 10 to 30 minutes, prior to cooling.

12. In a process of making phenolic resin adhesives having a desired body and high viscosity suitable for plywood manufacture and a high degree of reactivity in the hot-press, the steps of mixing redwood bark dust with a quantity of a predominantly high molecular weight aqueous alkaline, phenol-aldehyde resin characterized by a high degree of advancement of polymerization, said resin characteristics being evidenced by a viscosity of the resin at 77° F. of from 200 to 5000 centipoises and the formation of a precipitate upon addition of ethanol to the resin, said mixing occurring in the presence of water, adding alkali-metal hydroxide to said mixture, and allowing the same to react at a temperature not in excess of 160° F. to obtain activation and digestion of said bark dust, and thereafter dispersing an additional amount of said phenol-aldehyde resin in the product resulting from said reaction.

13. A stable high viscosity phenolic resin adhesive adapted for making boil-resistant hot-press plywood comprising the reaction product of redwood bark dust with alkali-metal hydroxide having dispersed therein a predominantly high molecular weight, aqueous, alkaline phenol-aldehyde characterized by a desirable high viscosity and body adapted to provide spreading with minimum penetration, and a predominantly high molecular weight and high degree of advancement of polymerization, said resin characteristics being evidenced by a viscosity of the resin at 77° F. of from 200 to 5000 centipoises and the formation of a precipitate upon addition of ethanol to the resin.

14. A phenolic resin adhesive as in claim 13 having a viscosity at 77° F. betwen about 2500 and 50,000 centipoises, and a high degree of thermo-setting reactivity to the C-stage at temperatures within the range from 200 to 320° F.

15. Hot-pressed plywood bonded with a phenolic resin adhesive as described in claim 14 in which said phenol-aldehyde resin is a phenol-formaldehyde of primarily high molecular weight components, and which exhibits a high degree of advancement of polymerization, said resin characteristics being evidenced by a viscosity of the resin at 77° F. of from 200 to 5000 centipoises and the formation of a precipitate upon addition of ethanol to the resin.

References Cited by the Examiner

UNITED STATES PATENTS

| | | | |
|---|---|---|---|
| 2,310,010 | 2/43 | Burrell | 260—17.5 |
| 2,360,376 | 10/44 | Van Epps | 161—262 |
| 2,380,214 | 7/45 | Burrell | 260—17.5 |
| 2,424,383 | 7/47 | Calvert | 260—7 |
| 2,574,784 | 11/51 | Heritage | 260—17.2 |
| 2,574,785 | 11/51 | Heritage | 260—17.5 |
| 2,878,197 | 3/59 | Baxter et al. | 260—17.5 |
| 2,926,722 | 3/60 | Lauring | 260—7 |
| 3,025,250 | 3/62 | Herrick et al. | 260—17.2 |
| 3,053,784 | 9/62 | Herrick et al. | 260—17.2 |

WILLIAM H. SHORT, *Primary Examiner.*

ALPHONSO D. SULLIVAN, LEON J. BERCOWITZ,
*Examiners.*

UNITED STATES PATENT OFFICE

CERTIFICATE OF CORRECTION

Patent No. 3,213,045 October 19, 1965

James A. Klein et al.

It is hereby certified that error appears in the above numbered patent requiring correction and that the said Letters Patent should read as corrected below.

In the drawing, Sheet 1, FIG. 1, in Step 16, for "surpress" read -- suppress --; column 3, line 1, for "in" read -- is --; line 57, for "supress" read -- suppress --; column 8, line 39, for "Boil-hear" read -- Boil-shear --.

Signed and sealed this 4th day of September 1966.

(SEAL)
Attest:

ERNEST W. SWIDER
Attesting Officer

EDWARD J. BRENNER
Commissioner of Patents